United States Patent [19]
Nomura et al.

[11] Patent Number: 6,122,973
[45] Date of Patent: Sep. 26, 2000

[54] ELECTROSTATIC CAPACITY-TYPE PRESSURE SENSOR WITH REDUCED VARIATION IN REFERENCE CAPACITANCE

[75] Inventors: Kazuo Nomura; Kiyoshi Tanaka; Satoshi Nakao; Hideki Tanigami; Kazutaka Hayashi, all of Toyama, Japan

[73] Assignee: Hokuriku Electric Industry Co., Ltd., Toyama, Japan

[21] Appl. No.: 09/068,789

[22] PCT Filed: Jul. 3, 1997

[86] PCT No.: PCT/JP97/00718

§ 371 Date: May 15, 1998

§ 102(e) Date: May 15, 1998

[87] PCT Pub. No.: WO98/12528

PCT Pub. Date: Mar. 26, 1998

[30] Foreign Application Priority Data

Sep. 19, 1996 [JP] Japan .................................... 8-247395
Dec. 6, 1996 [JP] Japan .................................... 8-326799

[51] Int. Cl.[7] ...................................................... G01L 9/12
[52] U.S. Cl. ........................................... 73/724; 361/283.4
[58] Field of Search ............................. 73/724; 361/283.4

[56] References Cited

U.S. PATENT DOCUMENTS

| 3,328,653 | 6/1967 | Wolf | 361/283.4 |
| 4,287,553 | 9/1981 | Braunlich | 73/724 |
| 4,329,732 | 5/1982 | Kavli et al. | 361/283 |
| 4,425,799 | 1/1984 | Park | 73/718 |
| 4,680,971 | 7/1987 | Kavli et al. | 73/718 |
| 4,735,098 | 4/1988 | Kavli et al. | 73/718 |
| 4,774,626 | 9/1988 | Charboneau et al. | 361/283 |
| 4,888,662 | 12/1989 | Bishop | 361/283 |

*Primary Examiner*—Joseph L. Felber
*Attorney, Agent, or Firm*—Pearne, Gordon, McCoy & Granger LLP

[57] ABSTRACT

A capacitance-type pressure sensor capable of reducing a variation in reference capacitance. The capacitance-type pressure sensor includes insulating spacer (3b) arranged between a main capacitive electrode (4) and a reference capacitive electrode (5) to couple a base substrate (1) and a diaphragm substrate (2) to each other. The insulating spacer (3b) is patterned so as to restrain a variation in distance between the reference capacitive electrode (5) and a counter electrode (10) arranged on the diaphragm substrate (2). Such construction reduces a variation in capacitance between the reference capacitive electrode (5) and the diaphragm electrode (10), to thereby increase accuracy at which a pressure is measured.

12 Claims, 8 Drawing Sheets

ELECTROSTATIC CAPACITY-TYPE PRESSURE SENSOR WITH REDUCED VARIATION IN REFERENCE CAPACITANCE

TECHNICAL FIELD

This invention relates to a capacitance-type pressure sensor adapted to measure a pressure based on a variation in capacitance.

BACKGROUND ART

U.S. Pat. No. 4,774,626 (corresponding to Japanese Patent Application Laid-Open Publication No. 19527/1988) discloses a capacitance-type pressure sensor which includes a base substrate provided thereon with a main capacitive electrode and a diaphragm substrate provided thereon with a counter electrode in a manner to be opposite to the main capacitive electrode and is so constructed that the base substrate and diaphragm substrate are joined at an outer periphery thereof to each other through a layer of sealing material, as well as a pressure sensor module including such a capacitance-type pressure sensor. U.S. Pat. No. 4,888,662 likewise discloses a pressure sensor module including a capacitance-type pressure sensor. As seen in each of the U.S. patents, fluid of which a pressure is to be measured is contacted with a rear surface of the diaphragm substrate of the pressure sensor.

U.S. Pat. Nos. 4,329,732, 4,735,098, 4,680,971 and 4,425,799 each disclose a capacitance-type pressure sensor wherein a base substrate is provided thereon with a reference capacitive electrode separately from a main capacitive electrode.

FIG. 19(A) schematically shows a conventional capacitance-type pressure sensor which includes a base electrode provided thereon with a main capacitive electrode and a reference capacitive electrode. The conventional capacitance-type pressure sensor includes a base substrate 31, which is formed thereon with a main capacitive electrode 32 and a reference capacitive electrode 33 in a manner to be spaced from each other at predetermined intervals. Also, it includes a diaphragm substrate 34, which is formed thereon with a diaphragm electrode 35 in a manner to be opposite to the main and reference capacitive electrodes 32 and 33. In the conventional capacitance-type pressure sensor thus constructed, external application of a pressure P of fluid which is to be measured to the diaphragm substrate 34 leads to deflection of the diaphragm substrate 34, resulting in a distance or interval between the main capacitive electrode 32 and the diaphragm electrode 35 being varied from D0 to D1, so that a capacitance between the main capacitive electrode 32 and the diaphragm electrode 35 may be varied, as shown in FIG. 19(B). Such a capacitance-type pressure sensor permits the pressure P to be measured or calculated on the basis of both a capacitance varied between the main capacitive electrode 32 and the diaphragm electrode 35 and a reference capacitance between the reference capacitive electrode 33 and the diaphragm electrode 35.

For the purpose of measuring the pressure P at increased sensitivity, the reference capacitance between the reference capacitive electrode 33 and the diaphragm electrode 35 is desirably kept from being varied due to application of any pressure to the capacitance-type pressure sensor. Nevertheless, such application of the pressure P to the diaphragm substrate 34 as shown in FIG. 19(B) causes the distance between the reference capacitive electrode 33 and the diaphragm electrode 35 to be slightly varied from D0 to D2, leading to a variation in reference capacitance between the reference capacitive electrode 33 and the diaphragm electrode 35. Thus, the conventional capacitance-type pressure sensor fails to measure a pressure at increased sensitivity.

SUMMARY OF THE INVENTION

It is an object of the present invention to provide a capacitance-type pressure sensor which is capable of reducing a variation in reference capacitance.

It is another object of the present invention to provide a capacitance-type pressure sensor which is capable of reducing a variation in reference capacitance without substantially preventing deflection of a diaphragm.

It is a further object of the present invention to provide a capacitance-type pressure sensor which is capable of facilitating manufacturing thereof while reducing a variation in reference capacitance.

It is still another object of the present invention to provide a capacitance-type pressure sensor which is capable of restraining a reduction in sensitivity thereof.

It Is yet another object of the present invention to provide a capacitance-type pressure sensor which is capable of ensuring removal or release of gas from an inside of a second pattern while restraining a reduction in sensitivity.

It is a still further object of the present invention to provide a capacitance-type pressure sensor which is capable of restraining an increase in parasitic capacity.

In accordance with the present invention, a capacitance-type pressure sensor generally includes a base substrate having a main capacitive electrode and a reference capacitive electrode arranged thereon in a manner to be spaced from each other at an interval, or distance, a diaphragm substrate including a diaphragm electrode arranged opposite to the main capacitive electrode and reference capacitive electrode, and a sealing insulating layer through which the base substrate and diaphragm substrate are joined at an outer peripheral portion thereof to each other. The present invention further includes an insulating spacer arranged between the main capacitive electrode and the reference capacitive electrode and coupled to the base substrate and diaphragm substrate. The insulating spacer has a pattern determined so as to restrain a variation in distance between the reference capacitive electrode and the diaphragm electrode.

When the pattern of the insulating spacer is formed so as to sealedly close a space between the main capacitive electrode and the diaphragm electrode (or a space in which the main capacitive electrode is positioned), the diaphragm is restrained from being deflected in spite of application of a pressure to the diaphragm when air is encapsulated in the space. Thus, the pattern of the insulating spacer is preferably arranged so as to permit a space in which the main capacitive electrode is positioned and that in which the reference capacitive electrode is positioned to communicate with each other therethrough. Such construction permits air to flow between the space in which the main capacitive electrode is arranged and that in which the reference capacitive electrode is arranged when a pressure is applied to the diaphragm, to thereby ensure deflection of the diaphragm. The insulating spacer and sealing insulating layer may be made of an identical insulating material. This ensures concurrent formation of both insulating spacer and sealing insulating layer by printing or the like and facilitates the formation.

DETAILED DESCRIPTION OF THE PREFERRED EMBODIMENTS

Figure 1:
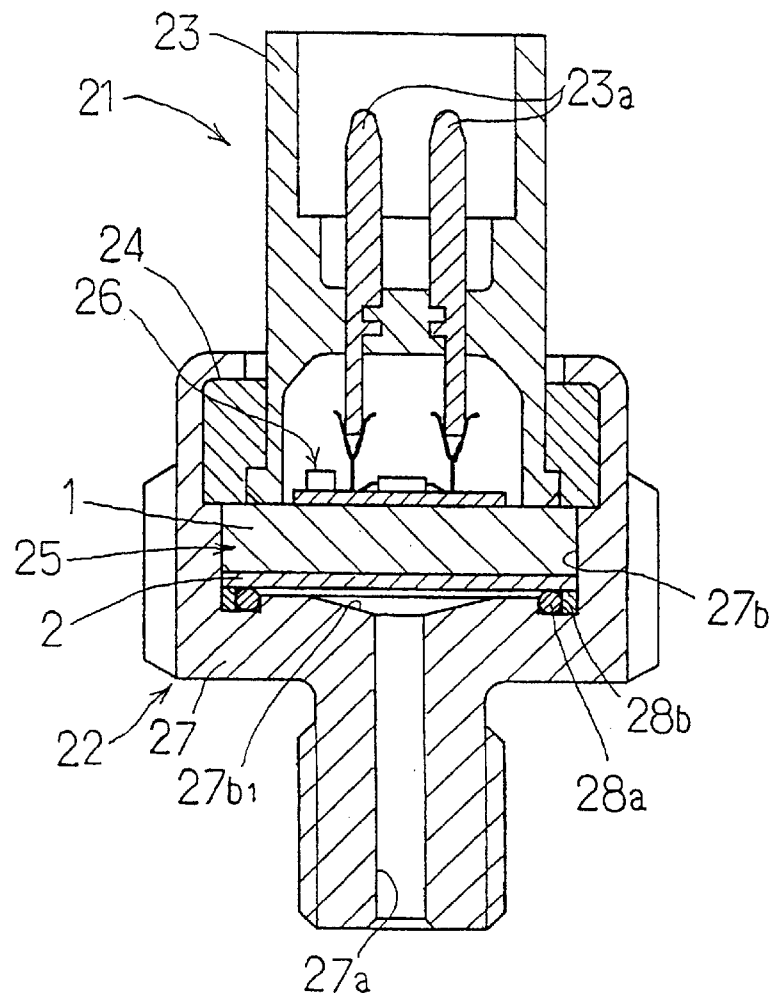
FIG. 1 is a vertical sectional view showing an example of a capacitance-type pressure sensor module having a capacitance-type pressure sensor according to the present invention incorporated therein.

Now, the present invention will be described hereinafter with reference to the accompanying drawings. FIG. 1 is a schematic sectional view showing a pressure sensor module having a capacitance-type pressure sensor of the present invention incorporated therein. The pressure sensor module, as shown in FIG. 1, generally includes a connector assembly 21 and a pressure sensor assembly 22 on which the connector assembly 21 is mounted. The connector assembly 21 includes a connector 22 and an annular support 24 in which the connector 22 is fitted. The pressure sensor assembly 22 includes a capacitance-type pressure sensor 25, a circuit board 26 and a housing 27.

The pressure sensor module thus constructed permits fluid to be measured (hereinafter referred to as "measured fluid") such as oil or water fed through a high-pressure fluid feed passage 27a of a housing 27 to act a pressure on a diaphragm substrate 2 of the pressure sensor 25 described hereinafter. This permits the pressure sensor 25 to measure a variation in pressure of the measured fluid in the form of a variation in capacitance to generate a signal, which is then fed to a circuit on the circuit board 26 on the base substrate 1 of the pressure sensor 25. The signal indicating a value of the pressure is processed in the circuit of the circuit board 26 and then fed to through a terminal member 23a of the connector 23 to an equipment (not shown) connected to the terminal member 23a.

Figure 2:
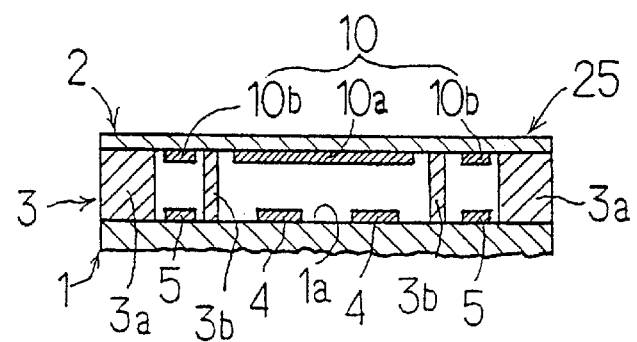
FIG. 2 is a sectional view showing an embodiment of a capacitance-type pressure sensor according to the present invention.

Referring now to FIG. 2, an embodiment of a capacitance-type pressure sensor according to the present invention is illustrated. A capacitance-type pressure sensor of the illustrated embodiment generally designated at reference numeral 25 includes a base substrate 1 made of a ceramic material and a diaphragm substrate 2, which are Joined or bonded to each other by means of a glass sealing pattern 3 made of a glass material forming a sealing insulating layer.

Figure 3:
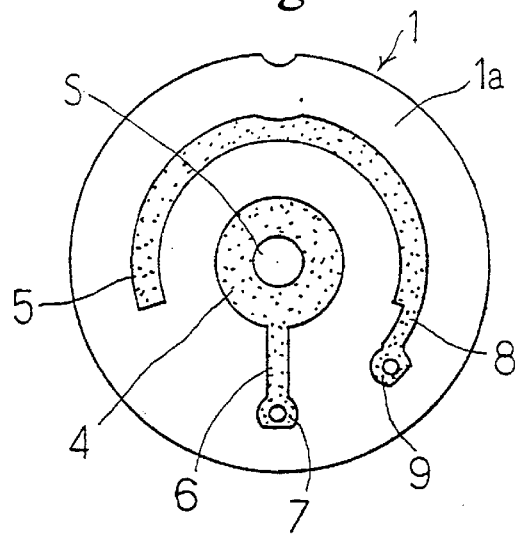
FIG. 3 is a plan view showing a base electrode section incorporated in the capacitance-type pressure sensor of FIG. 2.

The base substrate 1 which may be made of a ceramic plate of several millimeters in thickness, as detailedly shown in FIG. 3, is formed on one surface 1a thereof or a front surface thereof with a main capacitive electrode 4 and a reference capacitive electrode 5 in a manner to be spaced from each other at a predetermined interval or distance in a radial direction thereof. The main capacitive electrode 4 is made of a gold paste by screen printing and formed into a thickness of 0.7 $\mu$m and an annular shape. The main capacitive electrode 4 is electrically connected at a part thereof to a main capacitive electrode terminal 7 by means of a connection section 6 made of a lead wire. The connection section 6 and main capacitive electrode terminal 7 may be made of a gold paste concurrently with formation of the main capacitive electrode 4. The main capacitive electrode 4 of an annular shape has a space S defined at a central portion thereof, which serves to more accurately proportionally vary a capacitance between the main capacitive electrode 4 and a first electrode section 10a of a diaphragm electrode 10 depending on a pressure applied to the diaphragm substrate 2 and prevent contact between the diaphragm electrode or counter electrode 10 and the main capacitive electrode 4 due to application of a pressure of an excessive level to the diaphragm substrate 2, to thereby prevent short-circuiting therebetween.

The reference capacitive electrode 5 is made of a gold paste by screen printing in a manner similar to the main capacitive electrode 4. It is formed into a thickness of 0.7 $\mu$m. Also, the reference capacitive electrode 5 is formed into an arcuate shape so as to partially surround the main capacitive electrode 4 while being concentric with the main capacitive electrode 4. The reference capacitive electrode 5 is connected at one end thereof through a connection section 8 to a reference capacitive electrode terminal 9. The connection section 8 and reference capacitive electrode terminal 9 may be made concurrently with formation of the reference capacitive electrode 5. Actually, patterns of the main capacitive electrode 4, reference capacitive electrode 5, connection section 6, main capacitive electrode terminal 7, connection section 8 and reference capacitive electrode terminal 9 may be concurrently formed.

Figure 4:
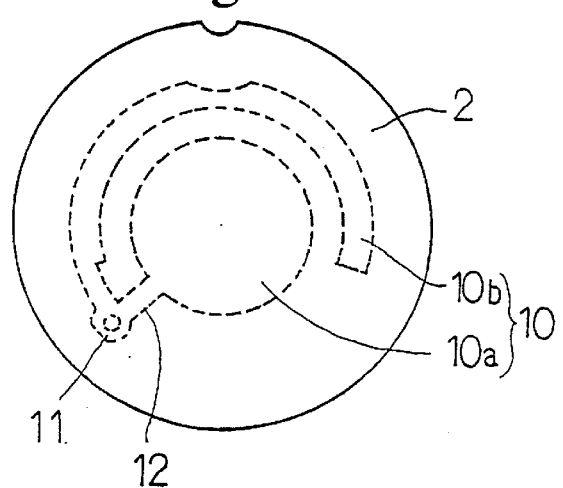
FIG. 4 is a rear view showing a diaphragm electrode section incorporated in the capacitance-type pressure sensor of FIG. 2.

The diaphragm electrode or counter electrode 10 described above is formed on one surface of the diaphragm substrate 2 or a front surface thereof as indicated at phantom lines in FIG. 4. More specifically, the diaphragm substrate 2 is made of a ceramic material and formed into a thickness of 0.8 mm and the counter electrode 10 is made of a gold paste by screen printing. The counter electrode 10 is formed into a thickness of 0.7 $\mu$m. Also, the counter electrode 10 includes a second electrode section 10b as well as the first electrode section 10a briefly described above. The first electrode section 10a is formed into a circular shape in a manner to be opposite to the main capacitive electrode 4 and the second electrode section 10b is formed into an arcuate shape in a manner to be opposite to the reference capacitive electrode 5. The second electrode section 10b is connected at one end thereof to a counter electrode terminal 11 and likewise the first electrode section 10a is electrically connected at a part thereof to the counter electrode terminal 11 through a connection section 12. The counter electrode 10, counter electrode terminal 11 and connection section 12 may be concurrently formed by single screen printing. In the illustrated embodiment, the glass sealing pattern 3 is formed into a thickness which permits a distance between the first electrode section 10a and the main capacitive electrode 4 and that between the second electrode section 10b and the reference capacitive electrode 5 to be about 10 $\mu$m.

Figure 5:
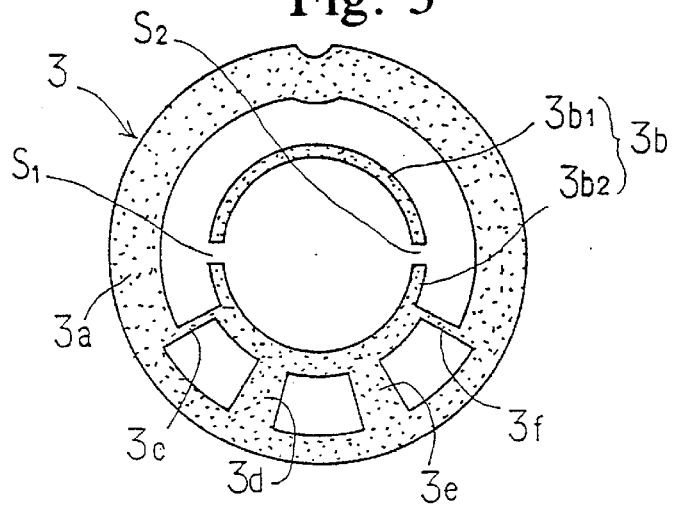
FIG. 5 is a plan view showing a glass sealing pattern incorporated in the capacitance-type pressure sensor of FIG. 2.

The joining pattern or glass sealing pattern 3 is made of an insulating material mainly consisting of glass and, as detailedly shown in FIG. 5, includes a sealing insulating layer (first pattern) 3a, an insulating spacer (second pattern) 3b and connection sections 3c to 3f. The sealing insulating layer 3a is formed into an annular shape so as to permit the base substrate 1 and diaphragm substrate 2 to be joined at an outer peripheral portion thereof to each other therethrough. More particularly, the sealing insulating layer 3a is positioned outside the reference capacitive electrode 5 to surround the reference capacitive electrode 5, to thereby join the base substrate 1 and diaphragm substrate 2 to each other while defining a predetermined interval or gap between a front surface of the base substrate 1 and that of the diaphragm substrate 2. Also, the insulating spacer 3b is arranged between the main capacitive electrode 4 and the reference capacitive electrode 5 and coupled to the base substrate 1 and diaphragm substrate 2. The insulating spacer 3b is formed into dimensions and a configuration which restrain a variation in distance between the reference capacitive electrode 5 and the counter electrode 10 or prevent a distance between the reference capacitive electrode 5 and the counter electrode 10 from being substantially varied. More specifically, the insulating spacer 3b includes a first spacer half 3b1 of a semi-annular shape and a second spacer half 3b2 of a semi-annular shape which are arranged opposite to each other, to thereby cooperate with each other to substantially form a circle while defining slits S1 and S2 therebetween which permit a space in which the main capacitive electrode 4 is positioned and that wherein the reference capacitive electrode 5 is positioned to communicate with each other therethrough.

It was confirmed that the capacitance-type pressure sensor of the illustrated embodiment reduces a variation in distance between the reference capacitive electrode 5 and the second electrode section 10b of the counter electrode 10 to a level one fortieth (1/40) (¹⁄₄₀) to fiftieth (1/50) (¹⁄₅₀) as compared with that of a capacitance-type pressure sensor free from any insulating spacer. Arrangement of the insulating spacer 3b causes the diaphragm substrate 2 to be increased in resistance to deflection. However, such a problem may be solved by reducing a thickness of the diaphragm substrate 2 to suitably adjust flexibility of the diaphragm substrate 2. Instead, it may be solved by making the diaphragm substrate 2 of any other suitable material. The connection sections 3c to 3f are arranged so as to radially extend from the second spacer half 3b2 toward the sealing insulating layer 3a to connect the second spacer half 3b2 and sealing insulating layer 3a to each other therethrough. The counter electrode terminal 11 is arranged in a manner to be enclosed with the second spacer half 3b2, connection section 3c, sealing insulating layer 3a and connection section 3d. The main capacitive electrode terminal 7 is enclosed with the second spacer half 3b2, connection section 3d, sealing insulating layer 3a and connection section 3e. Also, the reference capacitive electrode terminal 9 is enclosed with the second spacer half 3b2, connection section 3e, sealing insulating layer 3a and connection section 3f.

Figure 6:
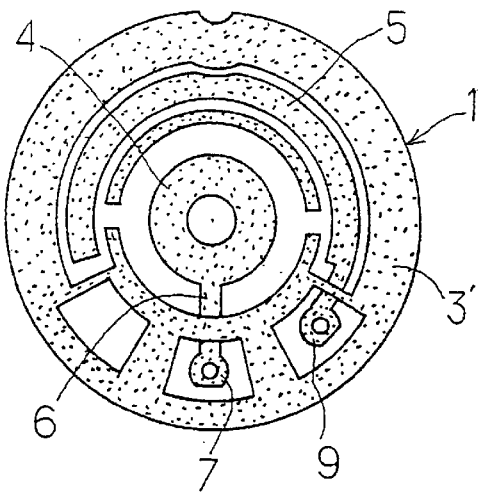
FIG. 6 is a plan view showing a glass sealing pattern formed on a base electrode section incorporated in the capacitance-type pressure sensor of FIG. 2.

In the illustrated embodiment, firstly the base substrate 1 and diaphragm substrate 2 are formed on the front surface thereof with the electrodes 4, 5 and 10 by printing or sputtering. Then, a mask having a predetermined mask pattern is arranged on the front surface of the base substrate 1, resulting in a glass sealing material pattern 3' being formed of a molten glass sealing material by screen printing, as shown in FIG. 6. Subsequently, the diaphragm 2 is superposed on the base substrate 1 through the glass sealing material 3' cured while keeping the electrodes 4 and 5 and the electrode 10 opposite to each other. Thereafter, the substrates 1 and 2 thus superposed on each other are placed in an oven to melt the glass sealing material pattern 3' to join the base substrate 1 and diaphragm substrate 2 to each other through the glass sealing pattern 3 to each other, resulting in the capacitance-type pressure sensor being completed.

Patterning of the insulating spacer 3b in a manner to close the space between the main capacitive electrode 4 and the diaphragm electrode 10 (or the space in which the main capacitive electrode is positioned) causes the diaphragm substrate 2 to be hard to deflect or bend due to application of a pressure to the diaphragm substrate 2, when air is encapsulated in the space. In order to avoid the problem, the illustrated embodiment is so constructed that the pattern of the insulating spacer 3b is formed with two such slits S1 and S2 (FIG. 5), resulting in the space in which the main capacitive electrode 4 is arranged and that in which the reference capacitive electrode 5 is positioned communicating with each other therethrough. Such construction permits air to move between both spaces when a pressure is applied to a rear surface of the diaphragm 2, so that the problem that the diaphragm is hard to deflect may be eliminated.

In the illustrated embodiment, the insulating spacer 3b is formed of two semi-annular spacer halves 3b1 and 3b2 while being spaced from each other at a predetermined interval, or distance resulting in being provided with two such slits S1 and S2. However, the present invention is not limited to such construction. The number of slits and a configuration of the insulating spacer may be suitably selected, so long as the diaphragm substrate 2 is permitted to deflect due to application of a pressure thereto and a variation in distance between the reference capacitive electrode 5 and the counter electrode 10 can be restrained.

Also, In the illustrated embodiment, the sealing insulating layer 3a and insulating spacer 3b are formed of the glass sealing pattern 3. Instead, the sealing insulating layer 3a and insulating spacer 3b may be made of a ceramic material, a resin material or the like. Use of the same material for the insulating spacer 3b and sealing insulating layer 3a ensures concurrent formation of the insulating spacer 3b and sealing insulating layer 3a by printing or the like and facilitates the formation. Nevertheless, it is a matter of course that the sealing insulating layer 3a and insulating spacer 3b may be made of materials different from each other.

Further, the above-described formation of the diaphragm electrode 10 in the manner that the first electrode section 10a and second electrode section 10b are respectively opposite to the main capacitive electrode 4 and reference capacitive electrode 5 permits the insulating spacer 3b to be joined to a portion of the front surface of the diaphragm substrate 2 exposed between the first electrode section 10a and the second electrode section 10b. This ensures firm coupling of the insulating spacer 3b to the diaphragm substrate 2.

Arrangement of the insulating spacer 3b between the main capacitive electrode 4 and the reference capacitive electrode 5 to couple the base substrate 1 and diaphragm substrate 2 to each other in the illustrated embodiment permits the diaphragm substrate 2 to be deflected in a space defined in the insulating spacer 3b, resulting in restraining a variation in distance between the reference capacitive electrode 5 and the second electrode section 10b of the counter electrode 10 due to application of a pressure to the diaphragm substrate 2. This reduces a variation in capacitance between the reference capacitive electrode 5 and the counter electrode (10b), to thereby increase accuracy with which the pressure is measured.

As a result of examining characteristics of the capacitance-type pressure sensor of the illustrated embodiment actually manufactured, it was found that the pressure sensor has sensitivity of a level lower than a theoretical value. The cause was studied. As a result, it was revealed that the second pattern or insulating spacer 3b of the joining pattern or glass sealing pattern 3 intersects the connection section or lead wire section 6 of the main capacitive electrode 4, to thereby reduce sensitivity of the pressure sensor. Sensitivity of the pressure sensor or sensitivity of a main capacity is defined to be (variation ΔCn in capacitance at a certain pressure)/(initial value Co). The initial value can be regarded as a sum (Cm+Cx) of a main capacity Cm obtained between the main capacitive electrode 4 and the first electrode section 10a of the counter electrode 10 when no pressure is applied to the sensor and a capacity Cx obtained between the lead wire section 6 and the first electrode section 10a of the counter electrode 10. Unfortunately, an insulating material such as a glass material used for the insulating spacer 3b is increased in dielectric constant, so that the capacity Cx is increased at an intersection between the insulating spacer 3b and the lead wire section 6. This results in a denominator of the above-described expression being increased, to thereby reduce sensitivity of the pressure sensor.

Referring now to FIGS. 7A to 12, another embodiment of a capacitance-type pressure sensor according to the present invention is illustrated, which is constructed so as to solve the above-described problem. In a capacitance-type pressure sensor of the illustrated embodiment, an insulating spacer 113 is arranged so as to be kept from intersecting a lead wire section 106 connected to a main capacitive electrode 104. Such construction keeps the lead wire section 106 and a counter electrode 110 from facing each other through the insulating spacer 113 inherently increased in dielectric constant, to thereby permit a reduction in capacity Cx between the lead wire section 106 and the counter electrode 110, resulting in preventing a reduction in sensitivity of the pressure sensor.

Figure 7A:
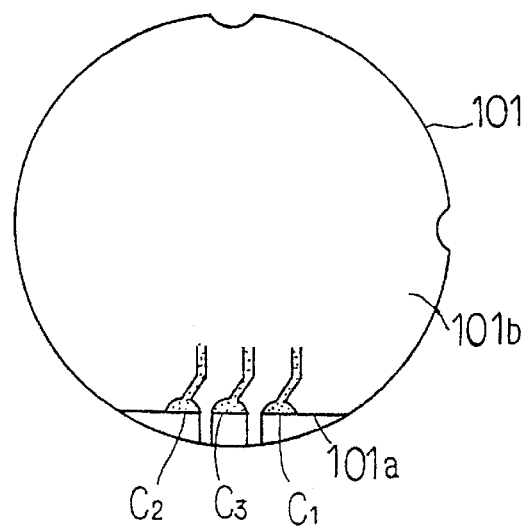
FIG. 7A is a plan view showing a second embodiment of a capacitance-type pressure sensor according to the present invention.
Figure 7B:
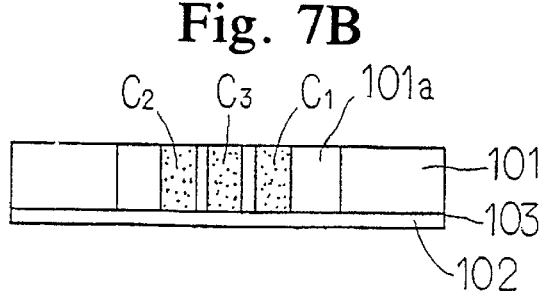
FIG. 7B is a side elevation view of the capacitance-type pressure sensor shown in FIG. 7A.
Figure 8:
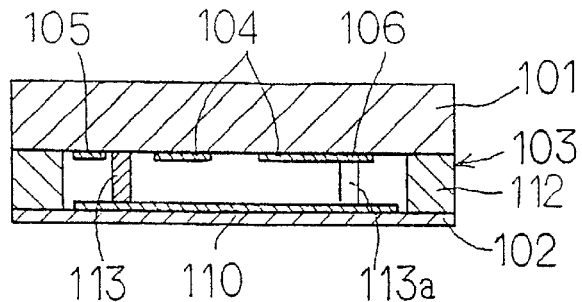
FIG. 8 is a schematic sectional view of the capacitance-type pressure sensor shown in FIG. 7A.
Figure 9:
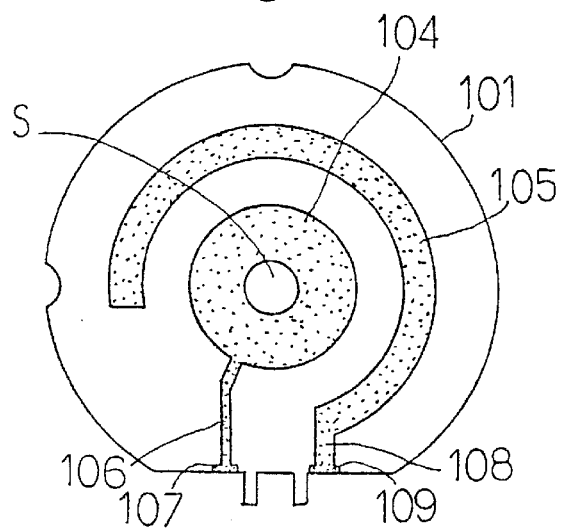
FIG. 9 is a plan view showing a base substrate incorporated in the capacitance-type pressure sensor shown in FIG. 7A.

The capacitance-type pressure sensor of the illustrated embodiment, as schematically shown in FIGS. 7 and 8, is so constructed that a base substrate 101 and a diaphragm substrate 102 are coupled to each other through a glass sealing pattern 103. The glass sealing pattern 103 is actually formed into a highly reduced thickness. In FIG. 8, a thickness of the glass sealing pattern 103 and an interval between the base substrate 101 and the diaphragm substrate 102 are exaggeratedly shown. The base substrate 101 is made of a ceramic material and formed into a substantially cylindrical shape. The base substrate 101 has a cut end surface or a side surface of which a part is cut into a flat shape as indicated at reference character 101a in FIG. 7(A). The base substrate 101 is formed on a surface thereof opposite to a surface thereof facing the diaphragm substrate 102 with a signal circuit (not shown). The base substrate 101 is formed on the surface thereof facing the diaphragm substrate 102 with the main capacitive electrode 104 and a reference capacitive electrode 105 in a manner to be spaced from each other at an interval distance in a radial direction thereof. The main capacitive electrode 104 is made of a gold (Au) paste by screen printing and formed into a thickness of 0.7 μm and an annular shape. The main capacitive electrode 104 is electrically connected at a part thereof through the lead wire section 106 to a main capacitive electrode terminal 107. The lead wire section 106 is formed into a width which is set to be smaller than that (1 mm) of a lead wire section 108 connected to the reference capacitive electrode 105 and so as to prevent tan δ determined by both a main capacitance between the main capacitive electrode 104 and the counter electrode 110 and a resistance value containing a resistance of the lead wire section 106 from being excessively increased. In the illustrated embodiment, the lead wire section 106 is formed into a width of from 0.4 to 0.6 mm. Also, the lead wire section 106 is formed into a length of 5.4 mm.

The lead wire section 106 and main capacitive electrode terminal 107 may be formed of a gold (Au) paste concurrently with formation of the main capacitive electrode 104. The reference capacitive electrode 105 is made of an Au paste by screen printing as in the main capacitive electrode 104 and formed into a thickness of 0.7 μm. The reference capacitive electrode 105 is formed into an arcuate shape in a manner to be concentric with the main capacitive electrode 104 and partially surround the main capacitive electrode 104 while being kept from intersecting the lead wire section 106. The reference capacitive electrode 105 is connected at one end thereof through the lead wire section 108 to a reference capacitive electrode terminal 109. The reference capacitive electrode terminal 109 is likewise made concurrently with formation of the reference capacitive electrode 105. Actually, patterns of the main capacitive electrode 104, reference capacitive electrode 105, lead wire sections 106 and 108, main capacitive electrode terminal 107, and reference capacitive electrode terminal 109 are concurrently formed. The main capacitive electrode terminal 107 and reference capacitive electrode terminal 109 are electrically connected through conductive connection sections C1 and C2 to a signal circuit (not shown) formed on the surface 101b of the base substrate 101 (FIGS. 7A and 7B). The conductive connection sections C1 and C2 are formed of a conductive paste on the cut end surface 101a of the base substrate 101.

Figure 10:
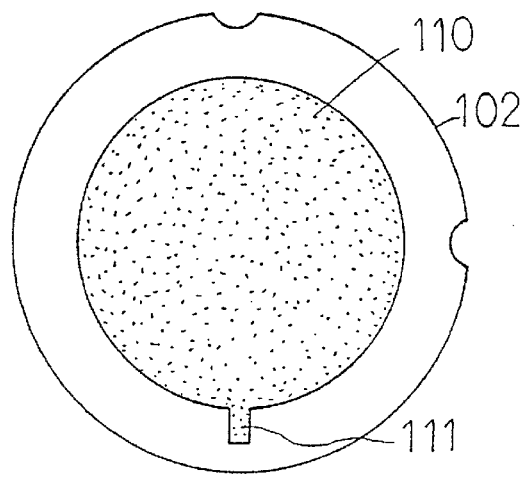
FIG. 10 is a plan view showing a diaphragm substrate incorporated in the capacitance-type pressure sensor shown in FIG. 7A.

The diaphragm substrate 102 is made of a ceramic material and formed into a thickness of 0.46 mm and a circular shape. The diaphragm substrate 102 is formed on a surface thereof opposite to the base substrate 101 with the counter electrode 110 as shown in FIG. 10. The counter electrode 110 is made of an Au paste by screen printing and formed into a thickness of 0.7 $\mu$m. The counter electrode 110 is formed into a circular shape and arranged opposite to the main capacitive electrode 104, lead wire section 106 and reference capacitive electrode 105 formed on the base substrate 101 while being spaced therefrom at predetermined intervals. The counter electrode 110 has a connection terminal 111 radially outwardly projected from a part thereof. The counter electrode 110 and connection terminal 111 are concurrently formed by one-time or single screen printing. The connection terminal 111 is electrically connected to the signal circuit (not shown) formed on the surface 101b of the base substrate 101 through a conductive connection section C3 formed of a conductive paste on the cut end surface 101a of the base substrate 101, as shown in FIGS. 7A and 7B.

Figure 11:
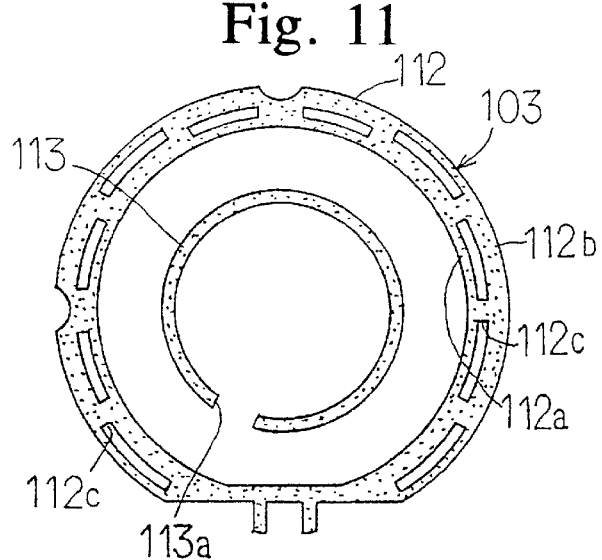
FIG. 11 is a plan view showing a joining pattern incorporated in the capacitance-type pressure sensor shown in FIG. 7A.

The glass sealing pattern 103 is made of an insulating material (joining material) mainly consisting of glass and formed into a thickness of 10 to 15 $\mu$m. The glass sealing pattern 103, as shown in FIGS. 8 and 11, includes a first pattern 112 acting as an insulating sealing layer and a second pattern 113 acting as an insulating spacer. The first pattern 112 is arranged outside the reference capacitive electrode 105 so as to surround the reference capacitive electrode 105 and formed into a shape corresponding to a contour of the base substrate 101 so as to intersect the two lead wire sections 106 and 108. Also, the first pattern 112 includes an inner peripheral edge 112a and an outer peripheral edge 112b which are connected to each other through connection pattern sections 112c. Such construction of the glass sealing pattern 103 prevents any void (crack) from being formed in the glass sealing pattern 103 during formation of the pattern 103.

The second pattern 113 is arranged between the main capacitive electrode 104 and the reference capacitive electrode 105, to thereby restrain a variation in interval or distance between the base substrate 101 and the diaphragm substrate 102 which occurs between the reference capacitive electrode 105 and the counter electrode 110. The second pattern 113 is formed into a substantially annular shape and is provided at a part thereof with a cutout 113a at which continuity of the second pattern 113 is interrupted. The cutout 113a acts to permit the lead wire section 106 connected to the main capacitive electrode 105 to extend therethrough without being contacted with the second pattern 113. The cutout 113 also acts as a vent passage which permits gas in the second pattern 113 to be removed therefrom.

Figure 12:
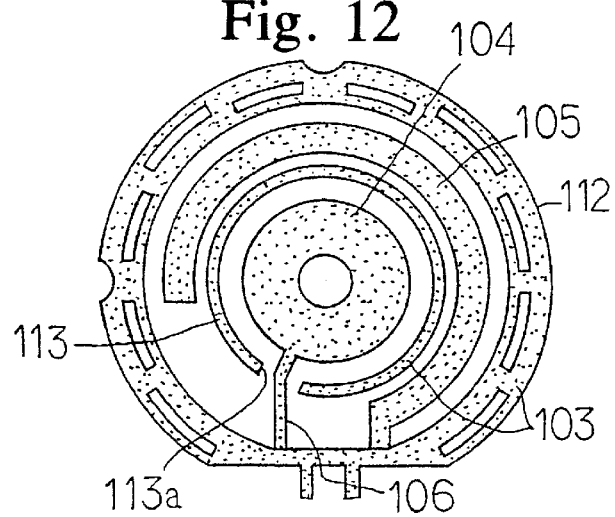
FIG. 12 is a plan view showing a pattern of a glass sealing material on a base electrode section incorporated in the capacitance-type pressure sensor shown in FIG. 7A.

Such arrangement of the cutout 113a at the intersection between the glass sealing material pattern 103 and the second pattern (insulating spacer) 113 as shown in FIG. 12 prevents the lead wire section 106 and counter electrode 110 from facing each other through the glass sealing pattern 103 inherently increased in dielectric constant, to thereby advantageously reduce a capacity between the lead wire section 106 and the counter electrode 110, resulting in restraining a reduction in sensitivity of the pressure sensor. The capacitance-type pressure sensor of the illustrated embodiment may be manufactured in substantially the same manner as the first embodiment described above. The conductive connection sections C1 to C3 may be made of a conductive paste such as a silver paste or the like subsequent to joining between the base substrate 101 and the diaphragm substrate 102.

Samples 1 to 4 of various capacitance-type pressure sensors were manufactured for measuring an initial value of the pressure sensor and sensitivity thereof. Sample 1 was manufactured according to the construction of the illustrated embodiment. Sample 2 was constructed in the same manner as Sample 1 except that the lead wire section 106 has the same width (1 mm) as that in Sample 1. Thus, Sample 2 is included in the scope of the present invention. Sample 3 was constructed in the same manner as Sample 1 except that the cutout 113a is not formed and the lead wire section 106 has the same width (1 mm) as that in Sample 1. Sample 4 was constructed in the same manner as Sample 1 except that the cutout 113a is not provided. Results of the measurement were as shown in Table 1.

TABLE 1

| Sample No. | Initial Value | Sensitivity |
| --- | --- | --- |
| 1 | 20 | 6 |
| 2 | 24 | 5 |
| 3 | 30 | 4 |
| 4 | 28 | 4.5 |

Table 1 indicates that the capacitance-type pressure sensors of Samples 1 and 2 are reduced in initial value, to thereby be increased in sensitivity, as compared with those of Samples 3 and 4. In particular, the capacitance-type pressure sensor of Sample 4 in which the lead wire section 106 is decreased in width is increased in sensitivity as compared with that of Sample 3, however, it is reduced in sensitivity as compared with Samples 1 and 2.

In the illustrated embodiment, the lead wire section 106 is formed into a width smaller than that of the lead wire section 108. However, it may be formed into any other suitable width.

The illustrated embodiment, as described above, is so constructed that the second pattern 115 is formed into a substantially annular shape of which continuity is interrupted by the cutout 113a which keeps the lead wire section 106 connected to the main capacitive electrode 104 from directly intersecting the second pattern 113 and more specifically permits the lead wire section 106 to intersect the second pattern 113 without being contacted with the second pattern 113. Such construction, as described above, also permits the cutout 113a to act as a vent passage as well. Lack of the cutout or vent passage 113a deteriorates deformation or deflection of the diaphragm when a pressure is applied thereto.

The lead wire section 106 connected to the main capacitive electrode 104 is preferably formed into a width smaller than that of the lead wire section 108 connected to the reference capacitive electrode 105. Intersection between the second pattern 113 and the lead wire section 106 through the cutout 113a while keeping both from being contacted with each other results in the capacity Cx being reduced. The capacity Cx is further reduced when the lead wire section 106 opposite to the counter electrode 110 is reduced in width. Thus, the pressure sensor is further increased in sensitivity. However, an excessive reduction in width of the lead wire section 106 causes an increase in resistance of the lead wire section 106, resulting in tan δ determined depending on a main capacitance and a resistance of the lead wire sections being excessively increased, leading to an increase in energy loss. Thus, it is required that the lead wire section 106 is formed into a width reduced while preventing an excessive increase of tan δ. More specifically, when the lead wire section connected to the main capacitive electrode is formed into a width of 0.4 to 0.6 mm, the sensitivity is increased while preventing an excessive increase of tan δ.

Figure 13A:
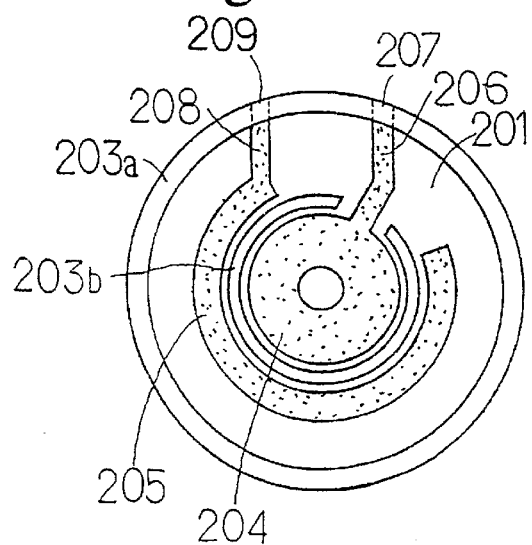
FIG. 13A is a view showing an electrode pattern on a base substrate incorporated in a further embodiment of a capacitance-type pressure sensor according to the present invention.
Figure 13B:
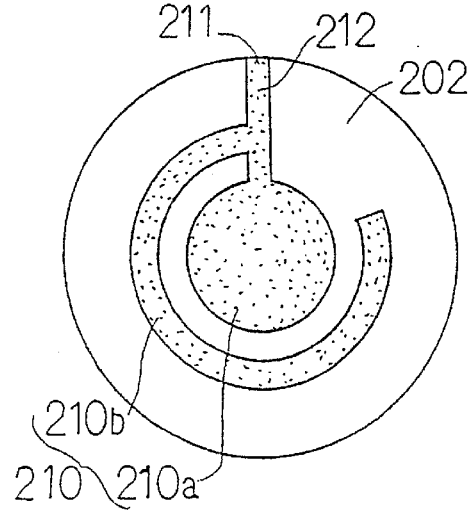
FIG. 13B is a view showing an electrode pattern on a diaphragm substrate incorporated in the capacitance-type pressure sensor shown in FIG. 13A.

In the present invention, patterns of the main capacitive electrode, reference capacitive electrode and counter electrode may be determined as desired. For example, the patterns may be determined in such a manner as shown in FIGS. 13A and 13B, which shows a further embodiment of a capacitance-type pressure sensor according to the present invention, wherein reference numerals correspond to the reference numerals discussed in the embodiment described above with reference to FIGS. 1 to 6, except with an additional prefix of 200. In a capacitance-type pressure sensor of the illustrated embodiment, a lead wire section 212 which is a connection section on a side of a counter electrode 210 is positioned between a lead wire section 206 which is a connection section connected to a main capacitive electrode 204 and a lead wire section 208 which is a connection section connected to a reference capacitive electrode 205 while keeping a base substrate 201 and a flexible substrate 202 joined to each other. An insulating spacer 203b is arranged so as to be kept from directly intersecting the lead wire section or the connection section extending from the main capacitive electrode 204 or so as to intersect the lead wire section without being directly contacted therewith.

Figure 14:
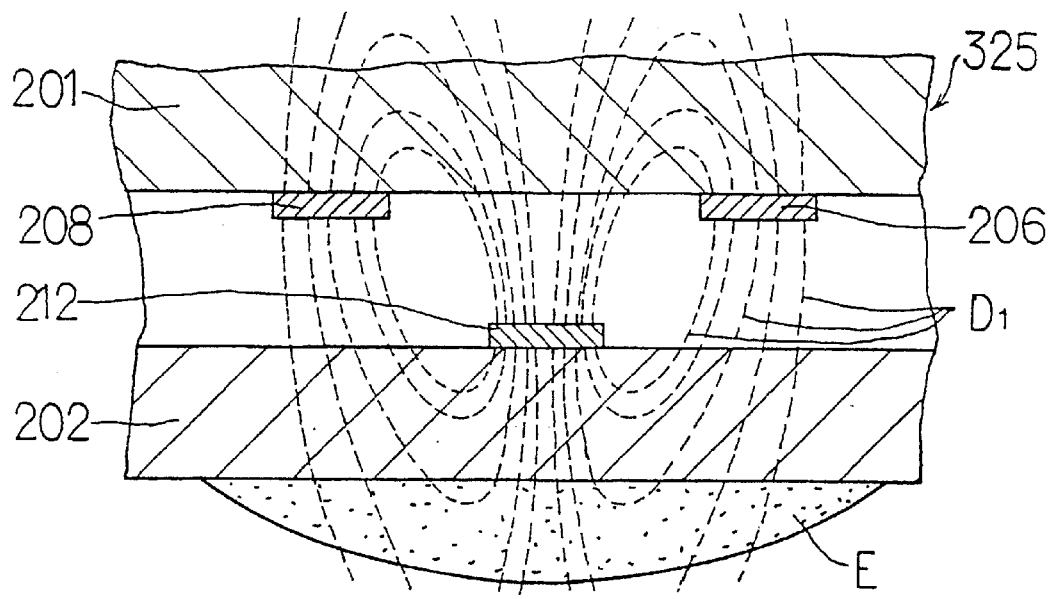
FIG. 14 is a sectional view showing electric lines of force in a lead wire section arranged in the capacitance-type pressure sensor shown in FIGS. 13A and 13B.

When a pressure of oil, water or the like is to be measured by the capacitance-type pressure sensor of the illustrated embodiment, firstly a pressure of fluid such as oil, water or the like is applied to a rear surface of the diaphragm substrate 202, to thereby deflect the diaphragm substrate 202, leading to a variation in capacitance between the main capacitive electrode 204 and a first electrode section 210a of the counter electrode 210. Then, the pressure is calculated on the basis of a main capacitance between the main capacitive electrode 204 and the first electrode section 210a and a reference capacitance between the reference capacitive electrode 205 and the second electrode section 210b. However, the capacitance-type pressure sensor of the illustrated embodiment causes an increase in parasitic capacity between the lead wire sections 206, 208 and the lead wire section 212, leading to addition of the parasitic capacity to the capacity measured on the basis of the main capacitance and reference capacitance, resulting in any error occurring in the pressure of fluid measured. Now, the reasons why the parasitic capacity is increased will be considered hereinafter. FIG. 14 is a sectional view of a portion of the capacitance-type at which the lead wire section 212 of FIG. 13(B) and the lead wire sections 206 and 208 of FIG. 13(A) correspond to each other. The lead wire section 212 and lead wire sections 206 and 208, as shown in FIGS. 13(A) and 13(B), are arranged in a manner to be obliquely opposite to each other (or in a manner to alternate with each other). On the rear surface of the diaphragm substrate 202 exists measured fluid E which is constituted by a dielectric substance such as oil or the like or a conductive substance such as water or the like. In the capacitance-type pressure sensor thus constructed, electric lines of force D1 outwardly discharged from the lead wire section 212 are caused to partially return through the measured fluid E to the lead wire sections 206 and 208 arranged obliquely opposite to the lead wire section 212. Thus, it would be considered that when the measured fluid E is a dielectric substance, the substance increased in dielectric constant exists between the lead wire sections 206, 208 and the lead wire section 212, leading to an increase in parasitic capacity. When the measured fluid E is a conductive substance such as water or the like, the electric lines of force D1 would pass through the conductive substance, so that a part of the electric lines of force D1 is deformed or bent, to thereby return to the lead wire sections 206 and 208 through a highly reduced distance, leading to an increase in parasitic capacity between the lead wire sections 206, 208 and the lead wire section 212.

Figure 15A:
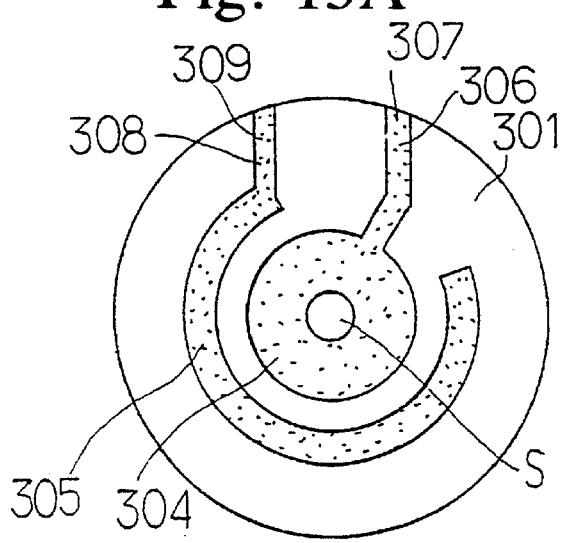
FIG. 15A is a plan view showing an electrode pattern on a base substrate arranged in still another embodiment of a capacitance-type pressure sensor according to the present invention.
Figure 15B:
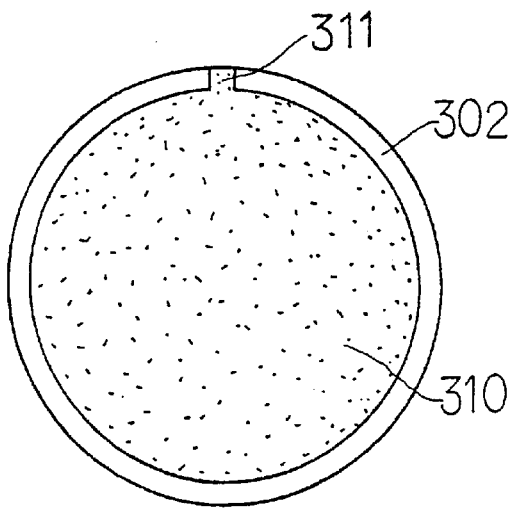
FIG. 15B is a plan view showing an electrode pattern on a diaphragm substrate incorporated in the capacitance-type pressure sensor of FIG. 15A.
Figure 16:
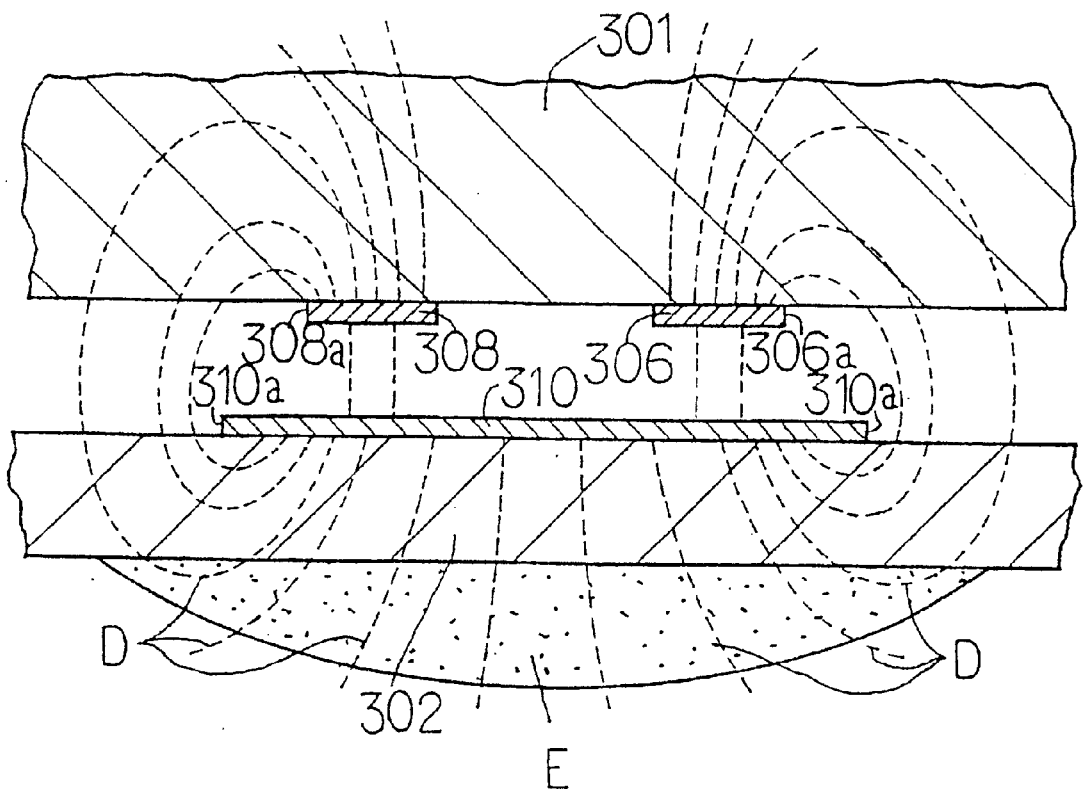
FIG. 16 is a sectional view showing electric lines of force in a lead wire section arranged in the capacitance-type pressure sensor shown in FIGS. 15A and 15B.

FIGS. 15(A) and 15(B) show an electrode pattern of a base substrate 301 and that of a diaphragm substrate 302 which are incorporated in still another embodiment of a capacitance-type pressure sensor according to the present invention, respectively. A capacitance-type pressure sensor of the illustrated embodiment is constructed so as to reduce the affect caused due to an increase in parasitic capacity. The base substrate 301 is made of a ceramic material and is formed on a surface thereof opposite to the diaphragm substrate 302 with a main capacitive electrode 304, a reference capacitive electrode 305, and two lead wire sections 306 and 308. The main capacitive electrode 304 is made of a gold paste by screen printing and formed into an annular shape. Also, the main capacitive electrode 304 is formed into a thickness of 0.7 $\mu$m and a diameter of 7.8 mm. The reference capacitive electrode 305 is made of a gold paste by screen printing, like the main capacitive electrode 304. The reference capacitive electrode 305 is formed into a thickness of 0.7 $\mu$m and an outer diameter of 15 mm. Also, the reference capacitive electrode 305 is formed into an arcuate shape so as to partially surround the main capacitive electrode 304. The first lead wire section 306 is connected to the main capacitive electrode 304 and the second lead wire section 308 is connected to one end of the reference capacitive electrode 305. The lead wire sections 306 and 308 are arranged so as to extend in juxtaposition to each other toward an outer peripheral portion of the base substrate 301 and have ends serving as terminal sections 307 and 309, respectively.

The diaphragm substrate 302 is made of an insulating ceramic material which permits it to be deflected depending on a pressure of fluid applied to the diaphragm substrate 302 when the pressure is applied to a rear surface of the substrate 302. The diaphragm substrate 302 is so arranged that the rear surface thereof is opposite to a bottom surface 27b1 of a pressure sensor receiving chamber 27b of a housing 27 through both an O-ring 28a shown in FIG. 1 and a backup ring 28b arranged outside the O-ring 28a in a manner to be concentric with the O-ring 28a. The diaphragm substrate 302 is provided on a front surface thereof or a surface thereof opposite to the base substrate 301 with a counter electrode (movable-side electrode pattern) 310 and a terminal (movable-side terminal pattern) 311 as shown in FIG. 15(B). The counter electrode 310 is made of a gold paste by screen printing. The counter electrode 310 is constituted by a disc-like electrode pattern of 0.7 $\mu$m in thickness and 18.6 mm in diameter. Also, the counter electrode is formed into a size sufficient to reduce an increase in parasitic capacity occurring due to existence of measured fluid such as oil or water on the rear surface of the diaphragm substrate 302. More specifically, it is formed into a size somewhat larger than a region corresponding to an oil adhering range (or a range surrounded by the O-ring 28 of FIG. 1) and formed into a diameter corresponding to a substantial part of the two lead wire sections 306 and 308 of the base substrate 301 other than the terminal sections 307 and 309.

The terminal section 311 is arranged so as to extend from the counter electrode 310 toward an outer peripheral portion of the diaphragm substrate 302. Also, the terminal section 311 includes an extension which is arranged so as to extend along the lead wire sections 306 and 308. However, the extension of the terminal section 311 is out of the oil adhering range (or the range surrounded by the O-ring 28 of FIG. 1), resulting in preventing the parasitic capacity from being substantially increased.

In the capacitance-type pressure sensor of the illustrated embodiment, fluid (water or oil) flowing through the high-pressure fluid feed passage 27a shown in FIG. 1 causes a pressure to be applied to the rear surface of the diaphragm substrate 302, to thereby deflect the diaphragm substrate 302, leading to a variation in interval or distance between the main capacitive electrode 304 and the counter electrode 310, resulting in a variation in capacitance between the main capacitive electrode 304 and the counter electrode 310.

In the capacitance-type pressure sensor of the illustrated embodiment, the lead wire sections 306 and 308 and the counter electrode having an area substantially larger than the lead wire sections 306 and 308 are arranged so as to be opposite to each other at a portion of the pressure sensor corresponding to a position at which the measured fluid E such as oil (dielectric substance) or water (conductive substance) exists. In other words, a portion of the counter electrode 310 opposite to the lead wire sections 306 and 308 constitutes a parasitic capacity increase restraining electrode section for restraining an increase in parasitic capacity. Thus, a distance by which electric lines of force D outwardly discharged from the parasitic capacity increase restraining electrode section of the counter electrode 310 opposite to the lead wire sections 306 and 308 return to the lead wire sections 306 and 308 through the measured fluid E is caused to be considerably increased. This results in the parasitic capacity being highly reduced. In particularly, an increase in distance by which ends 310a of the parasitic capacity increase restraining electrode section exceed outer ends 306a and 308a of the lead wire sections 306 and 308 leads to an increase in distance of the electric lines of force.

The capacitance-type pressure sensor (Sample 11) of the illustrated embodiment shown in FIG. 15 and the capacitance-type pressure sensor (Sample 12) having the electrode pattern shown in FIG. 13 were subject to a test for measuring a variation to a capacity value 25 pF while keeping oil (dielectric substance) or water (conductive substance) in the same amount existing on a portion of the rear surface of the diaphragm substrate corresponding to the lead wire sections. The capacitance-type pressure sensor having the electrode pattern shown in FIG. 13 is constructed in substantially the same manner as the capacitance-type pressure sensor of the illustrated embodiment shown in FIG. 15 except the counter electrode. The results were as shown in Table 2.

TABLE 2

| Sample | Capacity Variation (pF) | |
| --- | --- | --- |
|  | Water | Oil |
| 11 | +0.1 | +0.05 |
| 12 | +1.3 | +0.7 |

Table 2 indicates that the capacitance-type pressure sensor of the illustrated embodiment restrains an increase in parasitic capacity due to existence of oil (dielectric substance) or water (conductive substance) on the rear surface of the diaphragm substrate, to thereby reduce a variation in capacity (error).

Formation of the disc-like electrode pattern while increasing a diameter of the counter electrode in the embodiment shown in FIG. 15 permits the parasitic capacity increase restraining electrode section to be formed around a whole circumference thereof, to thereby positively restrain an increase in parasitic capacity even when positional relationship between the base substrate and the diaphragm substrate opposite to each other is deviated. This facilitates positioning between the fixed-side substrate and the movable-side substrate.

Figure 17:
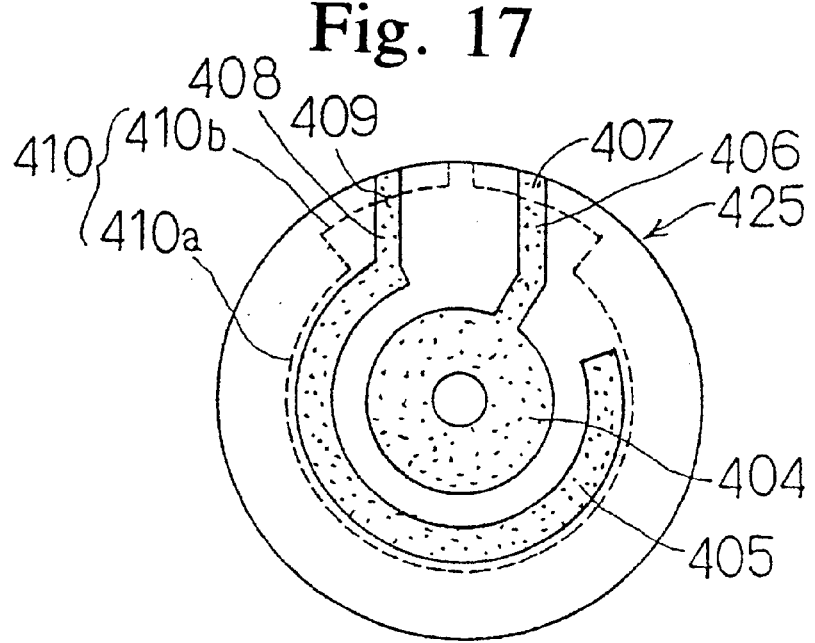
FIG. 17 is a view showing electrode patterns formed in yet another embodiment of a capacitance-type pressure sensor according to the present invention.

Referring now to FIG. 17, an electrode pattern of a capacitance-type pressure sensor 425 of yet another embodiment according to the present invention is illustrated. In connection with the illustrated embodiment, reference numerals correspond to the reference numerals discussed in the embodiment of FIG. 15, except with an additional prefix of 400. The capacitance-type pressure sensor 425 of the illustrated embodiment is constructed in substantially the same manner as the capacitance-type pressure sensor of FIG. 15 except a counter electrode 410. In FIG. 17, a main capacitive electrode 404, a reference capacitive electrode 405 and lead wire sections 406 and 408 formed on a base substrate are indicated at solid lines and the counter electrode 410 provided on a diaphragm substrate in a manner to be opposite the electrodes 404 and 405 and lead wire sections 406 and 408 on the base substrate are indicated at broken lines for the sake of brevity. In the illustrated embodiment, the counter electrode 410 includes a disc-like electrode pattern 410a and a parasitic capacity increase restraining electrode section 410b corresponding to the main capacitive electrode 404 and reference capacitive electrode 405. The parasitic capacity increase restraining electrode section 410b is formed so as to arcuately project from the disc-like electrode pattern 410a in a manner to be entirely opposite to one region on a front surface of the base substrate on which the lead wire sections 406 and 408 are formed. An insulating space (not shown) may be of course arranged in the illustrated embodiment as well. However, it is not necessarily required to combine a concept that the parasitic capacity increase restraining electrode section is arranged to reduce the parasitic capacity with a concept that the insulating spacer is arranged.

Figure 18:
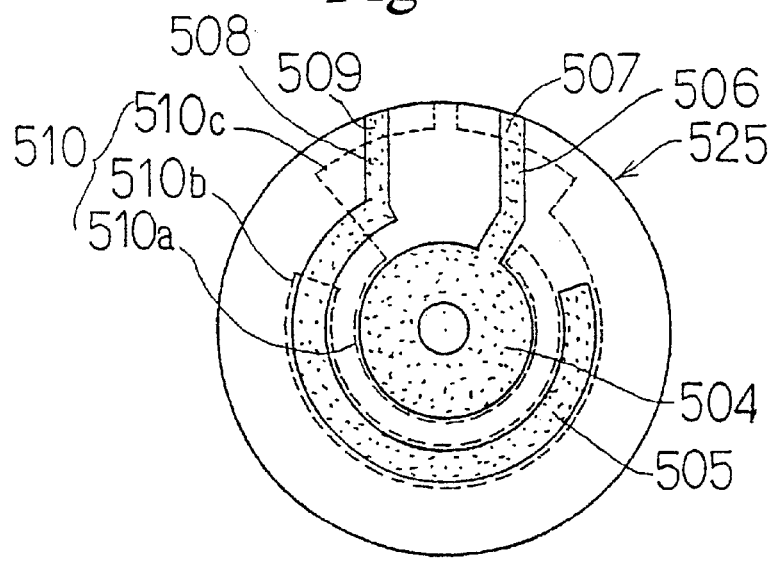
FIG. 18 is a view showing electrode patterns formed in a still further embodiment of a capacitance-type pressure sensor according to the present invention.
Figure 19A:
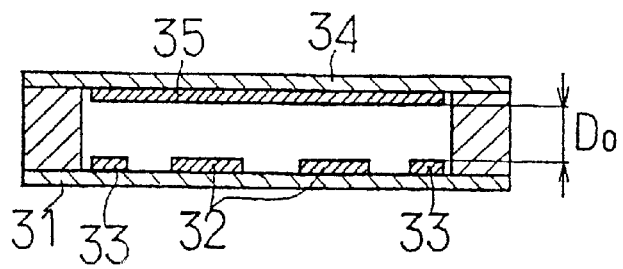
FIGS. 19A and 19B each are a sectional view showing a conventional capacitance-type pressure sensor.
Figure 19B:
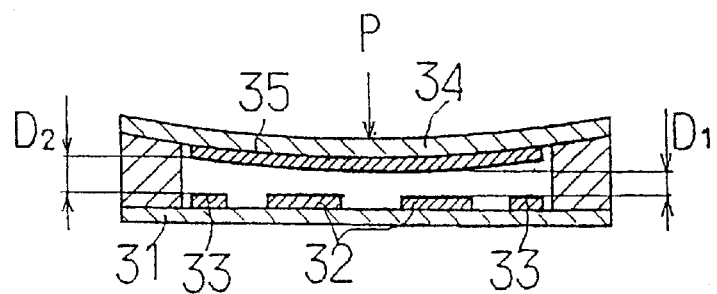

Referring now to FIG. 18, a capacitance-type pressure sensor 525 of a still further embodiment of the present invention and a counter electrode 510 are illustrated. The capacitance-type pressure sensor of the illustrated embodiment is constructed in substantially the same manner as the capacitance-type pressure sensor of FIG. 15 except the counter electrode 510. In the illustrated embodiment, the counter electrode 510 includes a first electrode section 510a corresponding to a main capacitive electrode 504, a second electrode section 510b corresponding to a reference capacitive electrode 505, and a parasitic capacity increase restraining electrode section 510c. The parasitic capacity increase restraining electrode section 510c is formed so as to project from the first electrode section 510a in a manner to be entirely opposite to one region on a front surface of a base substrate on which lead wire sections 506 and 508 are formed, like the parasitic capacity increase restraining electrode section 410b shown in FIG. 17. In other words, the counter electrode 510 corresponds to a combination of the counter electrode 210 shown in FIG. 13(B) with the parasitic capacity increase restraining electrode section 510c. An insulating spacer is of course arranged in the illustrated embodiment as well. Also, as in the embodiment described above with reference to FIG. 17, a concept that the parasitic capacity increase restraining electrode section is arranged to reduce the parasitic capacity is not necessarily required to be combined with a concept that the insulating spacer is arranged.

In each of the embodiments shown in FIGS. 15, 17 and 18, the parasitic capacity increase restraining electrode section is arranged on a side of the diaphragm substrate. Such arrangement permits electric lines of force discharged from the parasitic capacity increase restraining electrode section to return through a dielectric substance such as oil or a conductive substance such as water (fluid of which a pressure is to be measured) existing on a rear surface of the diaphragm substrate to the lead wire sections (306, 308 and the like) on the base substrate, resulting in a distance by which the electric lines of force pass being considerably increased. Such an increase in the distance significantly reduces the affect caused due to an increase in parasitic capacity even when the electric lines of force pass through the dielectric substance. Also, it reduces the number of electric lines of force returning through a reduced distance, to thereby restrain an increase in parasitic capacity, even when the electric lines of force pass through the conductive substance. Thus, the embodiments each effectively restrain occurrence of an error in measurement of a pressure of the fluid.

The parasitic capacity increase restraining electrode section is summarized as follows:

For example, the parasitic capacity increase restraining electrode may be constructed by extending the counter electrode toward the outer peripheral portion of the diaphragm substrate to render it opposite to the lead wire sections on the base substrate, to thereby restrain an increase in parasitic capacity. In order to restrain an increase in parasitic capacity when the counter electrode is thus extended to permit the parasitic capacity increase restraining electrode section to be constituted by the counter electrode, a size (area) of the parasitic capacity increase restraining electrode section and a configuration thereof are determined so that a distance by which electric lines of force discharged from the parasitic capacity increase restraining electrode section return through the dielectric substance or conductive substance positioned on the rear surface of the diaphragm substrate to the lead wire sections on the base substrate is increased sufficient to reduce a reduction in parasitic capacity. The size and configuration are varied depending on a size and a configuration of the lead sire sections on the base substrate. In particular, an increase in length or distance by which an outer end of the parasitic capacity increase restraining electrode section extends beyond an end of the lead wire sections on the base substrate leads to an increase in distance of the electric lines of force.

The parasitic capacity increase restraining electrode section may be connected to the counter electrode provided on the diaphragm substrate. Alternatively, it may not be connected to the counter electrode. Thus, the parasitic capacity increase restraining electrode section may be electrically independent or insulated from the counter electrode.

In general, a parasitic capacity is remarkably increased in a capacitance-type pressure sensor including a diaphragm substrate having a pressure of fluid increased in dielectric constant or conductivity applied to a rear surface thereof or a capacitance-type pressure sensor for measuring a pressure of fluid such as water. Also, a parasitic capacity is apt to be increased in a capacitance-type pressure sensor including a base substrate on which a plurality of lead wire sections are arranged. Application of the present invention to a capacitance-type pressure sensor in which a parasitic capacity is apt to be increased permits it to exhibit advantages of the present invention.

Industrial Applicability

Arrangement of the insulating spacer between the main capacitive electrode and the reference capacitive electrode to couple the base substrate and diaphragm substrate to each other permits a portion of the diaphragm surrounded by the insulating spacer to be deflected, resulting in restraining a variation in distance between the reference capacitive electrode and the diaphragm electrode due to application of a pressure to the diaphragm. This permits a variation in capacitance between the reference capacitive electrode and the diaphragm electrode, to thereby increase accuracy at which the pressure is measured.

We claim:

1. A capacitance-type pressure sensor comprising:
   a base substrate having a main capacitive electrode and a reference capacitive electrode arranged thereon in a manner to be spaced a distance from each other;
   a diaphragm substrate including a diaphragm electrode arranged opposite to said main capacitive electrode and reference capacitive electrode;
   a sealing insulating layer through which said base substrate and diaphragm substrate are joined at an outer peripheral portion thereof to each other; and
   an insulating spacer arranged between said main capacitive electrode and said reference capacitive electrode and coupled to said base substrate and diaphragm substrate;
   said insulating spacer having a pattern determined so as to restrain a variation in distance between said reference capacitive electrode and said diaphragm electrode.

2. A capacitance-type pressure sensor as defined in claim 1, wherein said insulating spacer is arranged so as to be kept from being contacted with said main capacitive electrode and reference capacitive electrode.

3. A capacitance-type pressure sensor as defined in claim 1, wherein said pattern of said insulating spacer is arranged so as to permit a space in which said main capacitive electrode is positioned and that in which said reference capacitive electrode is positioned to communicate with each other therethrough.

4. A capacitance-type pressure sensor as defined in claim 1, wherein said insulating spacer and sealing insulating layer are made of an identical insulating material.

5. A capacitance-type pressure sensor comprising:
   a base substrate made of a ceramic material and provided on one surface thereof with a main capacitive electrode of an annular shape, a lead wire section connected to said main capacitive electrode, a reference capacitive electrode of an arcuate shape arranged outside said main capacitive electrode in a manner to be kept from intersecting said lead wire section and a lead wire section connected to said reference capacitive electrode;
   a diaphragm substrate made of a ceramic material and provided on one surface thereof with a counter electrode in a manner to be spaced from said main capacitive electrode and reference capacitive electrode at a predetermined distance; and
   a joining pattern made of an insulating material mainly consisting of glass and arranged between said base substrate and said diaphragm substrate to join said base substrate and diaphragm substrate to each other while defining said predetermined distance between said base substrate and said diaphragm substrate;

said joining pattern including a first pattern and a second pattern, said first pattern being arranged outside said reference capacitive electrode to surround said reference capacitive electrode and intersecting said lead wire sections, said second pattern being positioned between said main capacitive electrode and said reference capacitive electrode to prevent said predetermined distance between said base substrate and said diaphragm substrate from being varied between said reference capacitive electrode and said counter electrode;

said second pattern being formed into an annular shape while being formed with a cutout which permits said lead wire section connected to said main capacitive electrode to pass therethrough without being contacted with said second pattern.

6. A capacitance-type pressure sensor comprising:

a base substrate provided on one surface thereof with a main capacitive electrode, a lead wire section connected to said main capacitive electrode, a reference capacitive electrode arranged outside said main capacitive electrode, and a lead wire section connected to said reference capacitive electrode;

a diaphragm substrate provided on one surface thereof with a counter electrode in a manner to be spaced from said main capacitive electrode, lead wire section and reference capacitive electrode at a predetermined distance;

a sealing insulating layer made of an insulating material and arranged between said base substrate and said diaphragm substrate and outside said reference capacitive electrode to surround said reference capacitive electrode and join said base substrate and diaphragm substrate to each other while defining said predetermined distance between said one surface of said base substrate and said one surface of said diaphragm substrate; and an insulating spacer arranged between said main capacitive electrode and said reference capacitive electrode to restrain said predetermined distance between said base substrate and said diaphragm substrate from being varied between said reference capacitive electrode and said counter electrode;

said insulating spacer being arranged so as to be kept from intersecting said lead wire connected to said main capacitive electrode.

7. A capacitance-type pressure sensor as defined in claim 6, wherein said lead wire section connected to said main capacitive electrode has a width smaller than that of said lead wire section connected to said reference capacitive electrode.

8. A capacitance-type pressure sensor as defined in claim 6, wherein said lead wire section connected to said main capacitive electrode has a width set within a range of from 0.4 to 0.6 mm.

9. A capacitance-type pressure sensor as defined in claim 6, wherein said diaphragm substrate is provided on said one surface thereof with a parasitic capacity increase restraining electrode section for restraining an increase of a parasitic capacity in a manner to be opposite to said lead wire sections.

10. A capacitance-type pressure sensor as defined in claim 9, wherein said parasitic capacity increase restraining electrode section is formed by projecting a portion of said counter electrode in a manner to be entirely opposite to one region on said one surface of said base substrate on which said lead wire sections are provided.

11. A capacitance-type pressure sensor as defined in claim 6, wherein said sensor is used in a manner to be contacted with fluid of which a pressure is to be measured on a rear surface of said diaphragm substrate;

said counter electrode being arranged in a manner to extend toward the outer peripheral portion of said diaphragm substrate so as to restrain an increase in parasitic capacity occurring due to existence of said fluid on said rear surface of said diaphragm substrate, resulting in being opposite to said lead wire sections.

12. A capacitance-type pressure sensor as defined in claim 11, wherein said counter electrode is constituted by a disc-like electrode pattern having a diameter, said disc-like electrode pattern being disposed opposite to said main capacitive electrode, said lead wire sections and said reference capacitive electrode.

* * * * *

UNITED STATES PATENT AND TRADEMARK OFFICE
CERTIFICATE OF CORRECTION

PATENT NO : 6,122,973
DATED : September 26, 2000
INVENTOR(S) : Nomura et al.

It is certified that error appears in the above-identified patent and that said Letters Patent are hereby corrected as shown below:

On the Title Page, Section [22], delete "PCT Filed: Jul. 3, 1997" and insert
--PCT Filed: March 7, 1997--.

Signed and Sealed this

Eighth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,122,973
DATED : September 26, 2000
INVENTOR(S) : Nomura et al.

It is certified that error appears in the above-indentified patent and that said Letters Patent is hereby corrected as shown below:

On the Title Page, Section [54], Line 1, delete "ELECTROSTATIC".

Column 1, Line 1, delete "ELECTROSTATIC".

Column 6, Line 7, delete "one fortieth (1/40)(1/40) to fiftieth (1/50(1/50)" and insert --one fortieth (1/40) to one fiftieth (1/50)--.

Column 8, Line 12, delete "FIGS. 7" and insert --FIGS. 7A, 7B--.

Column 10, Line 46, delete "115" and insert --113--.

Signed and Sealed this

Twenty-second Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,122,973
DATED : September 26, 2000
INVENTOR(S) : Nomura et al.

Page 1 of 1

It is certified that error appears in the above-identified patent and that said Letters Patent is hereby corrected as shown below:

Title page,
Section [54],
Line 1, delete "CAPACITY-TYPE" and insert -- CAPACITANCE-TYPE --.

Signed and Sealed this

Thirtieth Day of October, 2001

Attest:

NICHOLAS P. GODICI
Attesting Officer
Acting Director of the United States Patent and Trademark Office